July 29, 1969      E. NIEDERMAYER      3,457,948

PISTON-TYPE COMPRESSORS

Filed Aug. 19, 1965      2 Sheets-Sheet 1

Inventor
Egon Niedermayer
By
Watson, Cole, Grindle & Watson
Attys.

Inventor
Egon Niedermayer
By Watson, Cole, Grindle & Watson
Attys.

United States Patent Office 3,457,948
Patented July 29, 1969

3,457,948
PISTON-TYPE COMPRESSORS
Egon Niedermayer, 30 Herrandgasse, Graz, Austria
Filed Aug. 19, 1965, Ser. No. 481,124
Claims priority, application Austria, Aug. 21, 1964,
7,291/64
Int. Cl. F16k 15/02, 11/00
U.S. Cl. 137—533.17                    4 Claims

ABSTRACT OF THE DISCLOSURE

An automatic compressor valve composed of a plurality of identical valves on a supporting plate with each valve having a seat body with a passage therein and a flange and sealing surface with a floating plate and a limiting plate mounted on an outer rim of the flange.

---

The invention relates to an automatic compressor valve adapted for use in an assembly of compressor valves. These suction valves and delivery valves comprise valve bodies being designed, in a manner known per se, as circular plates whose outside diameter is so much larger than the diameter of the circular feed aperture that the valve fully open, the opening force as determined by the feed pressure and the feed cross-section, completely or almost equals the force produced by the vacuum in the valve clearance and acting in an opposite direction, the valves comprising valve seat plates and stroke-limiting plates which are common to all valves of the assembly. This means that the valve seat plate must be hardened and ground and besides, the valve seat plate(s) and the stroke-limiting plate(s) must be of different design depending on the type of compressor used, which is both a manufacturing handicap and a cost-increasing factor where various types of compressors are to be produced side by side on a large scale. It is the object of the invention to overcome these difficulties.

The invention provides for at least one valve supporting plate into which a valve seat body comprising a flange presenting the sealing surface for valve plates of the individual valves and a cylindrical extension for its anchorage in the valve supporting plate is inserted for each individual valve. Since this valve supporting plate does not serve as a sealing surface for the valve plates, it is easier to machine and the material of which it is made need not be hardened. The bores in the valve supporting plate into which the valve seat bodies are inserted may be produced by means of a drill without the need for finishing. Consequently, the valve supporting plate can be manufactured in an extremely simple manner either of cast-iron or steel.

According to another feature of the invention, the flange of the valve seat body may outwardly present the contours of a regular hexagon. Honeycomb-fashion, this design takes full advantage of the area available for the compressor valve assembly. Although when this type of valve seat bodies according to the invention are used, the area required is somewhat larger on account of the fact that the distance between the valve plates is approximately three percent greater, dead space can be reduced considerably.

In an embodiment of the invention wherein the valve plates are of arcuate design on the side facing away from the seat and consequently, centered in the open condition in a bore of a stroke-limiting plate, the said bore being provided in coaxial relation to the feed bore and of appropriate size, according to another feature of the present invention one valve seat comprising a hexagonal flange for each individual valve may be provided with a stroke-limiting plate, the contours of which define an almost equilateral triangle and which comprises three short legs serving for its anchorage at three corners of the hexagonal flange of the valve seat. The stroke limiting plate may be mounted on the valve seat following the insertion of the valve reed, e.g., by means of butt-welding, hard-soldering or gluing or by some snapping appliance such as a patent fastener. The difference between the hexagonal surface of the valve seat body and the triangular surface of the stroke limiting plate are three segmental surfaces serving for the evacuation of the gas from the valve, the said gas being evacuated in a direction perpendicular to the seat of the valve plate. The size of the said three segmental surfaces determines not only the resistance to flow through the valve but, when the valve unit is used as a suction valve, also the size of the dead space of the compressor. Experience goes to show that if the segmental surfaces are of appropriate size, the dead space can be considerably reduced as compared with the conventional design hereabove described.

According to another feature of the invention, the attachment of the valve seat bodies and/or valve units to the valve supporting plate may be assured by providing a cylindrical extension of the valve seat body of a length about equal to the thickness of the valve supporting plate, with an annular groove in the vicinity of its outer extremity, so that the valve seat body can be mounted in the valve supporting plate by upsetting the valve supporting plate around the outer extremity of the cylindrical extension, the pinched material of the valve supporting plate penetrating into the annular groove. Both with delivery and suction valves the high air-pressure invariably acts from above on the flange of the valve seat body, so that the upset connection is not subject to air pressure.

Further details of the invention will appear from the following description of two embodiments of the invention with reference to the accompanying drawings in which.

Figure 1:
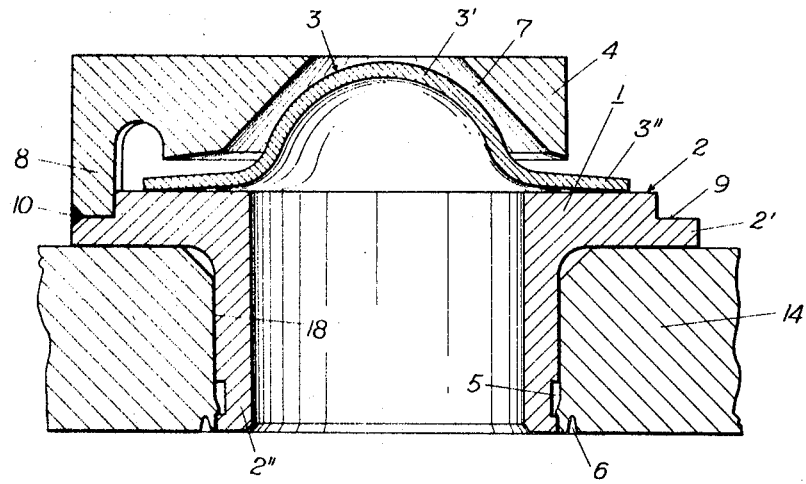
FIG. 1 shows an axial cross-sectional view of an automatic compressor valve according to the invention, and FIG. 2 a top view of same.
Figure 2:
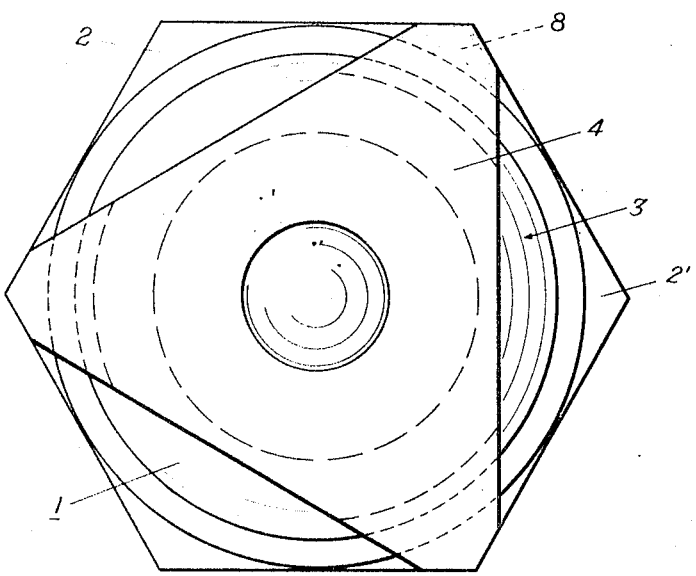

The valve supporting plate of the compressor valve 1 according to the invention illustrated in FIGS. 1 and 2 is designated by reference number 14, the valve seat body by reference number 2, the valve plate by number 3 and the stroke-limiting plate by number 4. The valve seat body 2 comprises a flange 2' presenting the outer contours of a regular hexagon and a tubular element 2" the length of which equals the thickness of the compressor valve 1. Close to its outer extremity the tubular element 2" is provided on its outer periphery with an annular groove 5 serving for the anchorage of the valve seat body 2 in the valve plate 14. For the purpose, the annular groove 6 is pressed in following the insertion of the valve seat body 2 in the bore 18 by means of a cylindrical punch, the material of the valve plate being squeezed into the annular groove 5.

The upper front face of the flange 2' provides the sealing surface for the valve plate 3 of circular design and comprising a cupola-shaped central portion 3' and a conical rim 3". The valve plate 3 is centered by means of a tapered bore 7 of the stroke-limiting plate and maintained in that position. The stroke-limiting plate 4 almost presents the contours of an equilateral triangle and is provided with short legs 8 at its corners. The cross-section of these legs is indicated by a dotted line in FIG. 2. The three legs 8 of the stroke-limiting plate 4 engage in the valve seat body 2 at three corners of same at a recess 9 provided in the said valve seat body. The stroke-limiting plate 4 is anchored in the valve seat body 2 following the insertion of the valve plate 3, e.g., by butt-welding, hard-soldering, gluing or by means of a snapping device such as a patent fastener. In the present instance a peripheral seam 10, e.g., a welding seam or a soldered joint is provided for the purpose. The valve seat body 2 and the stroke-limiting plate 4 are easy to manufacture, e.g., from any suitable rolled material.

The valve unit as hereabove described may be used in conjunction with compressor valves of different design both for a suction and for a delivery valve, the number of valve units to be used depending on the capacity of the compressor. The compressor may be either water-cooled or air-cooled.

Figure 3:
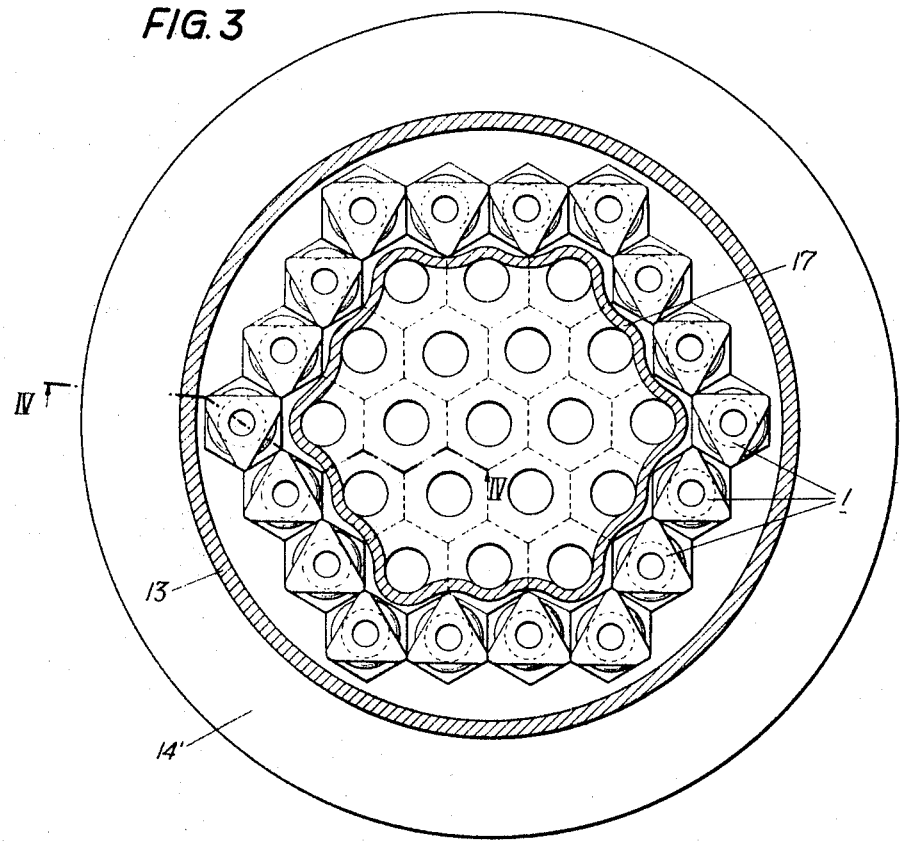
FIGS. 3 and 4 illustrate a combined suction-and-delivery valve according to the invention, FIG. 3 being a cross-sectional view on line III—III of FIG. 4 and FIG. 4 a cross-section through the center, identical elements being designated by the same reference numbers.
Figure 4:
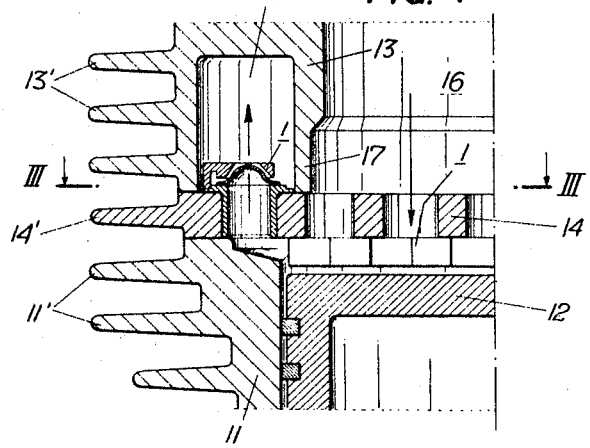

FIGS. 3 and 4 illustrate a suction-and-delivery valve according to the invention for an air-cooled compressor. The compressor cylinder is designated by reference number 11, the compressor piston by 12, the cylinder head by 13 and the valve supporting plate by 14. The cooling ribs of these elements are designated by reference numbers 11', 13' and 14', respectively. The delivery chamber 15 of the cylinder head is separated from the suction chamber 16 by a web 17 extending as far as the valve supporting plate 14. In the area of the delivery chamber 15 the valve plate 14 comprises a string of delivery valves consisting, as do the suction valves arranged within the web 17, of valve units as illustrated in FIGS. 1 and 2 and as hereinbefore described, the only difference consisting in the fact that the delivery valves are inserted into the valve supporting plate 14 from above and the suction valves from below.

As will be seen from FIG. 3, the valve units 1 are arranged with their hexagonal flanges honeycomb-fashion in order to save space in addition to their being mutually secured against rotation. The shape of the web 17 of the cylinder head 13 should be such as to encompass the flanges of the outer delivery valves on the one hand and to stay clear of the outlets of the inner suction valves, on the other hand. As appears from the drawing, this condition has been met by the rippled design of the web 17.

The valve units can be advantageously manufactured as prefabricated elements in serial production by manufacturers who are not expected to engage in the assembly of valves for various types of compressors.

I claim:

1. An automatic compressor valve adapted for use in an assembly of identical compressor valves upon a common supporting plate having the same number of through bores as there are valves in the assembly, each valve having a valve seat body comprising a tubular element for the passage of gases mounted in one of the said through bores, a flange located at one extremity of the tubular element, a sealing surface on an outer front face of the flange, a freely-floating valve plate having a cupola-shaped central portion and a conical rim cooperating with and disposed over the said sealing surface, and a stroke-limiting plate mounted on the outer rim of the said flange and arranged in spaced relation to the sealing surface and presenting a bore in coaxial relation to the said tubular element, the valve-plate with its cupola-shaped central portion being centered inside the said bore when the valve is open.

2. An automatic compressor valve as claimed in claim 1, wherein the flange of the valve seat body outwardly presents the contours of a regular hexagon.

3. An automatic compressor valve as claimed in claim 2, wherein the contours of the stroke-limiting plate present an approximate equilateral triangle, the said stroke-limiting plate comprising three legs located in the three corners of the said stroke-limiting plate and attached to three corners of the said flange of the valve seat.

4. An automatic compressor valve as claimed in claim 1, wherein the said tubular element of each valve seat body is of a length approximately equal to the thickness of the valve supporting plate, an annular groove in the vicinity of the outer extremity of the tubular element being provided by means of which the said valve seat body can be mounted in the valve supporting plate by upsetting the valve supporting plate around the outer extremity of the tubular element, the squeezed material of the valve supporting plate penetrating into the said annular groove.

References Cited

UNITED STATES PATENTS

| | | | |
|---|---|---|---|
| 528,360 | 10/1894 | Caldwell | 137—512.1 |
| 2,087,407 | 7/1920 | Jones | 137—512.1 |
| 2,599,898 | 6/1952 | Dalrymple | 137—454.4 |
| 2,657,708 | 11/1953 | Kamm | 137—512.1 |
| 2,904,065 | 9/1959 | Butlin | 137—454.4 |
| 2,981,462 | 4/1961 | Niedermayer | 137—512.1 |

FOREIGN PATENTS 20,740   10/1905   Great Britain.

WILLIAM F. O'DEA, Primary Examiner

W. H. WRIGHT, Assistant Examiner

U.S. Cl. X.R.

137—512.1